(12) United States Patent
Kim et al.

(10) Patent No.: US 12,092,773 B2
(45) Date of Patent: Sep. 17, 2024

(54) X-RAY DETECTOR WITH INTERDIGITATED NETWORK

(71) Applicants: Gangneung-Wonju National University Industry Academy Cooperation Group, Gangneung-si (KR); Northeastern University, Boston, MA (US); Seoul National University R&DB Foundation, Seoul (KR); The General Hospital Corporation, Boston, MA (US)

(72) Inventors: Hyehee Kim, Boston, MA (US); Yung Joon Jung, Lexington, MA (US); Hak Soo Choi, Needham, MA (US); Young Lae Kim, Portland, OR (US); Geehyun Kim, Seoul (KR)

(73) Assignees: Gangneung-Wongju National University, Gangneung-si (KR); NORTHEASTERN UNIVERSITY, Boston, MA (US); THE GENERAL HOSPITAL CORPORATION, Boston, MA (US); SEOUL NATIONAL UNIVERSITY R&DB FOUNDATION, Seoul (KR)

( * ) Notice: Subject to any disclaimer, the term of this patent is extended or adjusted under 35 U.S.C. 154(b) by 38 days.

(21) Appl. No.: 18/065,344

(22) Filed: Dec. 13, 2022

(65) Prior Publication Data

US 2023/0184966 A1 Jun. 15, 2023

Related U.S. Application Data

(60) Provisional application No. 63/265,306, filed on Dec. 13, 2021.

(51) Int. Cl.
*G01T 1/185* (2006.01)

(52) U.S. Cl.
CPC .................... *G01T 1/185* (2013.01)

(58) Field of Classification Search
CPC ................................ G01T 1/185
See application file for complete search history.

(56) References Cited

U.S. PATENT DOCUMENTS

| 4,795,909 A * | 1/1989 | Dibianca ................. H01J 47/02 250/374 |
| 8,367,035 B2 | 2/2013 | Rogers et al. |
| | | (Continued) |

OTHER PUBLICATIONS

Sugime, H. et al., "An interdigitated electrode with dense carbon nanotube forests on conductive supports for electrochemical biosensors", Analyst, 2018, 143, 3635-3642, Royal Society of Chemistry.

*Primary Examiner* — David P Porta
*Assistant Examiner* — Fani Polyzos Boosalis
(74) *Attorney, Agent, or Firm* — Hamilton, Brook, Smith & Reynolds, P.C.

(57) ABSTRACT

A radiation detection device includes a sensor having a first electrode and a second electrode. The first and second electrode each defines a plurality of fingers comprising a nanotube material, and the fingers of each electrode are interdigitated with one another. A voltage source may be configured to apply a voltage across the first and second electrodes. A chamber contains the sensor with a gas, one or more walls of the chamber enabling passage of radiation external to the chamber. A detection circuit detects radiation within the chamber based on a change in current across the first and second electrodes resulting from ionization of the gas by the radiation.

20 Claims, 8 Drawing Sheets

(56) References Cited

U.S. PATENT DOCUMENTS

| | | |
|---|---|---|
| 10,036,728 B2 | 7/2018 | Li et al. |
| 10,422,892 B2 | 9/2019 | Nellissen et al. |
| 2007/0080304 A1* | 4/2007 | Rush .................. H01T 19/04 |
| | | 250/423 R |
| 2007/0132043 A1* | 6/2007 | Bradley ............. G01N 27/4146 |
| | | 257/414 |
| 2010/0193695 A1 | 8/2010 | Yeow et al. |
| 2015/0155127 A1* | 6/2015 | Fink .................... H05H 3/06 |
| | | 250/427 |
| 2015/0168565 A1 | 6/2015 | Altavilla et al. |
| 2019/0243009 A1 | 8/2019 | Hao et al. |

* cited by examiner

X-RAY DETECTOR WITH INTERDIGITATED NETWORK

RELATED APPLICATION

This application claims the benefit of U.S. Provisional Application No. 63/265,306, filed on Dec. 13, 2021. The entire teachings of the above application are incorporated herein by reference.

BACKGROUND

The use of ionizing radiation detectors has rapidly increased in several industries. In particular, X-ray detectors have been widely used in medical imaging, aerospace, defense, and security applications as well as research in nuclear physics, high-energy physics, astrophysics, and radiochemistry.

Conventional X-ray sensors for the detection of ionizing radiation have widely used scintillators such as ZnS(Ag), CsI(TI), $Bi_4Ge_3O_{12}$ (BGO), and glass fibers and semiconductors employing two terminal structures or field-effect transistors (FETs). High resistivity silicon, amorphous silicon, high purity germanium (HPGe), selenium, diamond, cadmium telluride (CdTe), and silicon carbide (SiC) are intensively explored for inorganic X-ray detectors since these inorganic materials offer high detection efficiency, high energy resolution, and room-temperature operation. However, these inorganic materials require a complex fabrication process that results in high production costs with various process steps, limited flexibility, relatively low sensitivity, and high operational voltage (>500 V).

The organic detectors fulfill the demand for large-scale, high sensitivity, low-cost, lightweight, and high flexibility, which current inorganic sensors cannot achieve. Organic or hybrid organic-inorganic materials such as bismuth oxide, poly(triarylamine), methylammonium lead tribromide perovskite, organic semiconductors, and high atomic number nanoparticles increase the availability of fabrication in a large area, relatively low cost, and mechanical flexibility. However, it is still limited due to the inherently low electron carrier mobility of organic materials, which results in low sensitivity, high noise, and prolonged recovery time. Even though a highly efficient semiconductor hybrid methylammonium lead iodide perovskite-based detector with low lag decay has been reported, it still needs a relatively high operating bias voltage.

SUMMARY

Example embodiments include a device for the detection of radiation. The device may include a sensor having a first electrode and a second electrode. The first electrode may have a first plurality of fingers comprising a nanotube material, and the second electrode having a second plurality of fingers comprising a nanotube material, the second plurality of fingers being interdigitated with the first plurality of fingers. A voltage source may be configured to apply a voltage across the first and second electrodes. A chamber may contain the first and second electrodes and a gas, at least one wall of the chamber enabling passage of radiation external to the chamber. A detection circuit may be configured to detect radiation within the chamber based on a change in current across the first and second electrodes resulting from the ionization of the gas by the radiation.

The nanotube material may be at least one of carbon nanotube materials and a graphene materials. The first plurality of fingers may be separated from the second plurality of fingers by a distance of 200 nanometers to 500 micrometers. The gas may be an inert gas comprising at least one of krypton, nitrogen, argon, and xenon. The radiation may be at least one of X-ray radiation and gamma radiation. The voltage across the first and second electrodes may be less than 10 millivolts. The first plurality of fingers may include between 5 and 500,000 fingers. Each of the first plurality of fingers may extend in parallel to one another. Each of the first plurality of fingers may have a width of 1-500 micrometers. Each of the first plurality of fingers may have a length of 1-50 millimeters.

Further embodiments include a method of detecting radiation. A voltage may be applied across the first and second electrodes, the first electrode having a first plurality of fingers comprising a nanotube material, the second electrode having a second plurality of fingers comprising a nanotube material, the second plurality of fingers being interdigitated with the first plurality of fingers. Radiation may be enabled to pass into a chamber containing the first and second electrodes and a gas. The radiation may be detected within the chamber based on a change in current across the first and second electrodes resulting from ionization of the gas by the radiation.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

DETAILED DESCRIPTION

A description of example embodiments follows.

Considerable interest in low size, weight, and power (SWaP) X-ray detectors has led to an increase in demand for smaller and more lightweight X-ray sensor devices that show high sensitivity with lower power, good reliability, and good stability. Example embodiments provide an ultralow-power and miniaturized X-ray sensor based on an organized nanotube (e.g., single-walled carbon nanotube (SWCNT)) microarchitecture, which can overcome some of the critical challenges of solid-state X-ray sensors. Example embodiments may employ a Geiger-Mueller counter design, while a micropatterned SWCNT interdigitated network architecture may be used as electrodes instead of metals. Unlike a conventional Geiger counter that requires high operating voltages of 400-900 V, a SWCNT micro-interdigitated electrode creates a strong electric field effect between and within the SWCNT electrodes even at 5 µV (power consumption of 40-45 fW), enabling a facile detection of electrons generated by the X-ray radiation. Furthermore, due to the unique interdigitated electrode design, the X-ray sensor may also provide extremely low or no signal noise in the device (several picoamperes), resulting in the high sensitivity of the X-ray radiation of 203.96 $\mu C \cdot Gy^{-1} \cdot cm^{-2}$ under the X-ray exposure of 42.19 $\mu Gy \cdot s^{-1}$, which is a remarkably lower operating voltage with high detection sensitivity compared to recently published works. Moreover, the SWCNT-based X-ray sensor does not require any recovery time after the initial detection, allowing the device to profile X-ray radiation in real-time for microscale and ultralow power X-ray dosimeter applications. Although example embodiments described below describe the detection of X-ray radiation, embodiments may be configured to detect other types of radiation such as gamma radiation.

Figure 1A:
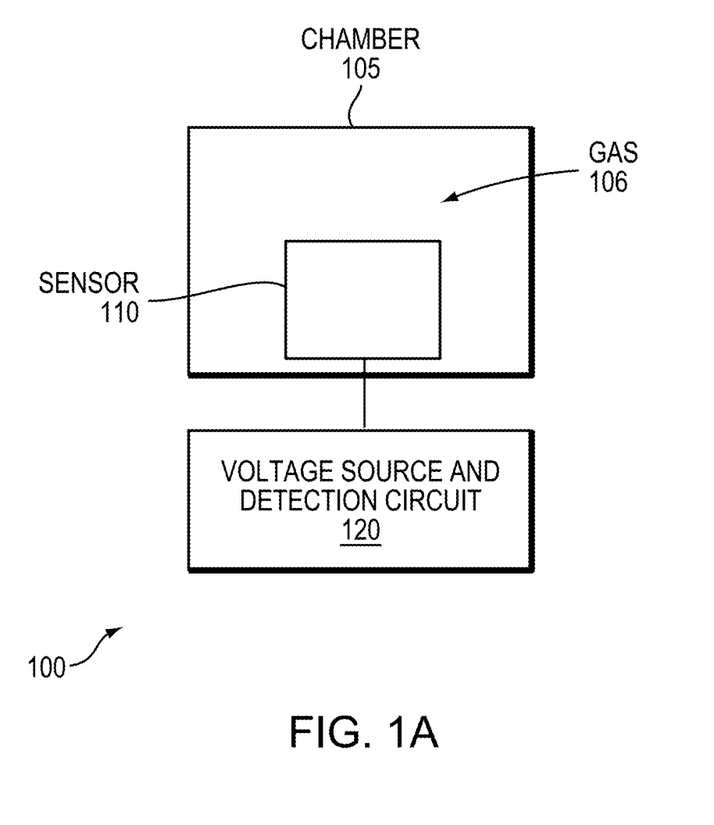
FIG. 1A is a diagram of a radiation detector device in one embodiment.

FIG. 1A is a diagram of a radiation detector device 100 in one embodiment. The device 100 may include a sensor 110 having a first electrode and a second electrode, as described in further detail below with reference to FIGS. 1B-C. A voltage source and detection circuit 120 may be configured to apply a voltage across the electrodes of the sensor 110, as well as monitor a current across the electrodes. A chamber 105 may enclose the detector 106 and a gas that can be ionized by the radiation to be detected, such as krypton, nitrogen, argon, xenon, and/or any other gas within the ionization energies between nitrogen and Xenon. At least one wall (e.g., a window) of the chamber 105 may enable passage of radiation external to the chamber. The voltage source and detection circuit 120 may be configured to detect radiation within the chamber 105 based on a change in current across the electrodes of the sensor 110 resulting from ionization of the gas by the radiation.

Figure 1B:
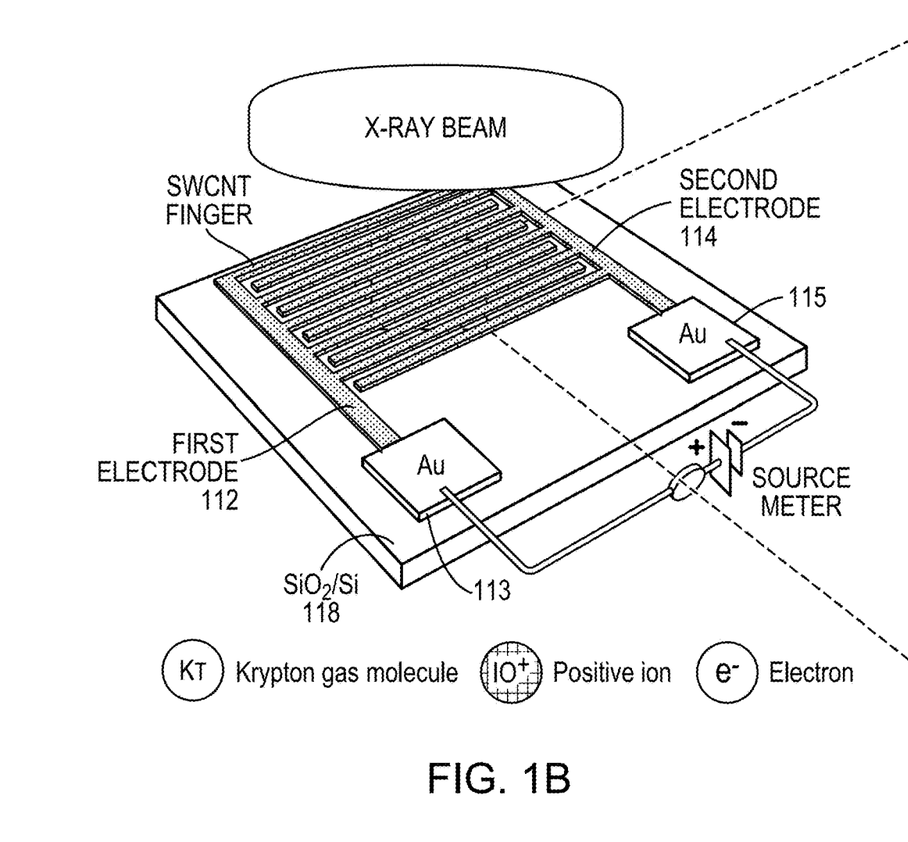
FIGS. 1B-C illustrate a detector element of a detector device in one embodiment.

FIG. 1B illustrates the sensor 110, having microscale interdigitated nanotube electrodes, in further detail. The sensor 110 may implement the design of the Geiger counter while being developed in a two-dimensional (2D) microscale interdigitated electrode architecture using a highly organized nanotube (e.g., SWCNT) network. The network may include a first electrode 112 and a second electrode 114, each comprising the nanotube material and including several interdigitated fingers. The microscale interdigitated nanotube sensor 110 may be fabricated on a substrate 118 (e.g., SiO2 wafer) using template-guided fluidic assembly of the nanotubes. Gold contacts 113, 115 may then be deposited on each nanotube interdigitated network electrode 112, 114 for electrical signal characterization driven by radiation. An advantage of using a network of nanotube interdigitated electrodes is a higher electrical field per unit area than conventional metal electrodes, due to an enhanced local electric field effect arising from the microscale nanotube interdigitated structure.

Figure 1C:
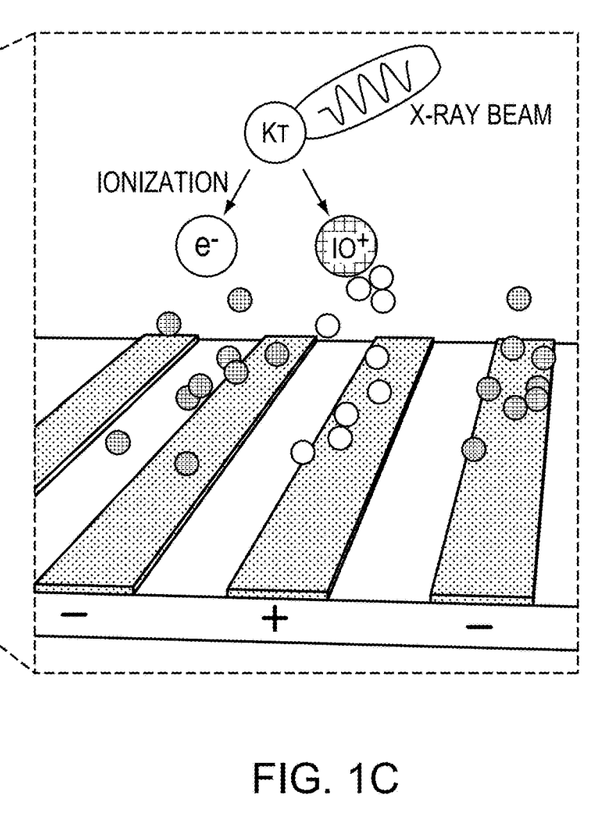

FIG. 1C is an inset view of FIG. 1B, and illustrates the mechanism of radiation sensing performed by the sensor 110. First, inert gases such as krypton or nitrogen inside the chamber may be ionized by X-ray radiation. Then, the electrodes 112, 114 may generate an electrical field between electrodes due to the applied voltage, which separates the positive ions and negative electrons formed by X-ray radiation. Then, the sensor 110 may detect the generated electrons instantly with the 60 Hz sampling rate via the detection circuit 120 or a comparable measurement system, leading to a change in the current.

In one embodiment, the electrodes 112, 114 may be a highly organized nanotube interdigitated micropattern with a 50 µm spacing at different magnifications. The sensor 110 may have 40 nanotube finger electrodes on each side, positive and negative. Each nanotube finger electrode is 50 µm in width and 9.5 mm in length. The total area of the nanotube electrode may be 38 mm2, which is 47.8% of the total area of the sensing device. The electrical paths that connect the nanotube finger electrodes to the metal electrical contacts may also be patterned with nanotubes with a width of 300 µm and a length of 1000 µm for the conformal electrical contact formation. Example embodiments may be tested via placement in a vacuum chamber, which may be evacuated to a base pressure of 200 mTorr and then filled with gas, either krypton or nitrogen, that has an ionization energy of 1.351 and 1.402 KJ/mol, respectively, as a source of ions and electrons by X-ray radiation.

Figure 2A:
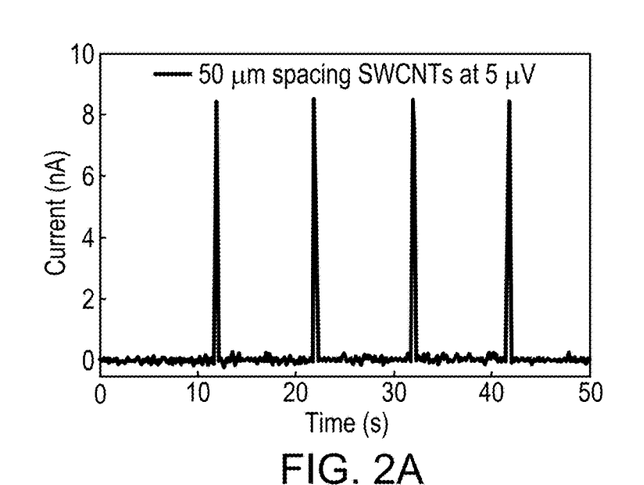
FIGS. 2A-F are plots illustrating electrical response of a radiation detector in one embodiment.
Figure 2B:
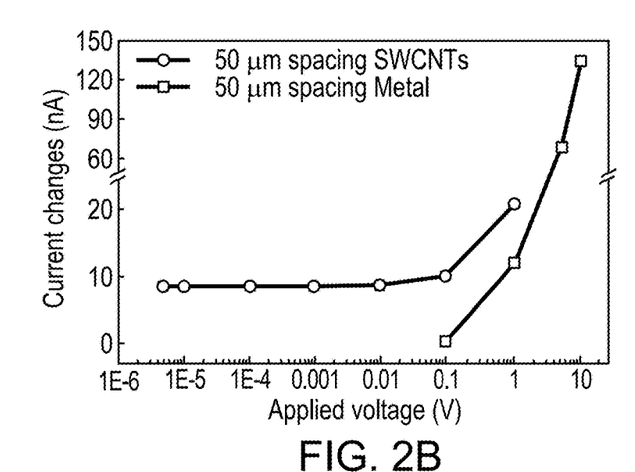

FIGS. 2A-F are plots illustrating electrical response of an example radiation sensor configured as described above with reference to the sensor 110. In particular, FIGS. 2A-B show the electrical responses of a nanotube network-based sensor, having interdigitated fingers of 50 µm in width and 50 µm spacing under the same dose conditions of X-ray radiation (50 kVp). FIG. 2A shows the electrical current changes of the nanotube interdigitated device at 10 s intervals under 0.1 s maximum X-ray radiation exposure of 176.7 $\mu Gy \cdot s^{-1}$. A significant change in current (approximately 8-9 nA) under X-ray radiation may be observed at an extremely low operating voltage of 5 µV with a very low power consumption of 40-45 fW.

FIG. 2B compares the performance of the sensor ("50 µm spacing SWCNTs) with an Au interdigitated electrode device with the same electrode dimension and density. The sensor demonstrated excellent X-ray sensing capability under an applied voltage range of 5 µV to 1 V without changing the level of detection current. On the other hand, an Au interdigitated device could not detect the X-ray radiation at lower than 1 V. Further, the Au interdigitated device has a much higher noise level (up to 680 nA) than the picoampere level exhibited by the sensor.

A number of mechanisms may explain the demonstrated X-ray sensing performance by the sensor under extremely low voltage. First, to create an electric current between separated electrodes under a given electric field, electrons need sufficient energy to overcome the potential barrier at the conductor-vacuum interface (the work-function $\varphi$) which is the potential difference between the Fermi level of the conductor and the vacuum. The workfunction $\varphi$ of the gold film is 5.1 eV, and the value for nanotubes is between 4.16 and 4.56 eV depending on their chirality, indicating that the nanotube interdigitated architecture makes the current flow easier than a gold interdigitated structure.

The strength of the electric field between and within micropatterned interdigitated electrodes also significantly contributes to increasing current changes under lower voltage. For carbon nanotubes, the intrinsic field-enhancement factor β can be written as $\beta=1.2\times(2.5+1/r)0.9$, where r is the radius of carbon nanotube. The typical β values of a carbon nanotube film are $3\times10^4$ to $5\times10^4$, which is three to four orders higher than the gold film due to their high aspect ratio and high conductivity. The macroscopic electric field, E, and the local field, Elocal, are related as Elocal=β·E. Because nanotubes have a high aspect ratio, nanotubes show an extremely large field enhancement factor and promote very high local electric field intensities around the nanotube apexes. In those aspects of nanotubes, the electric field near the tip area and the edge of the nanotube arrays were locally concentrated and more substantial than other regions. Hence, when compared with metal electrodes, the microstructure of the nanotube electrode produces a more concentrated field per unit voltage. Moreover, the electric field equation is E=V/d (V/m), where V is the voltage applied across the nanotube finger electrodes and d is the distance between them. Therefore, when the applied electric potential is fixed (here at 5 µV), the electric field is inversely proportional to the distance between nanotubes' finger electrodes. As a result, the local electric field for a 50 µm distance is greater than that of a 200 µm distance (see FIGS. 2E-F, described below).

Figure 2C:
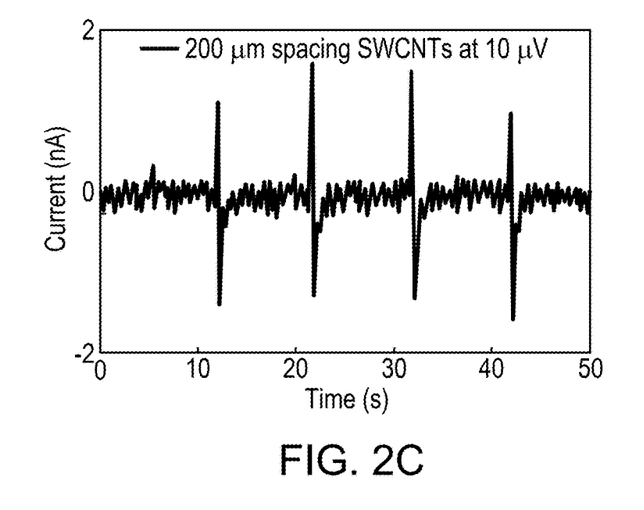
Figure 2D:
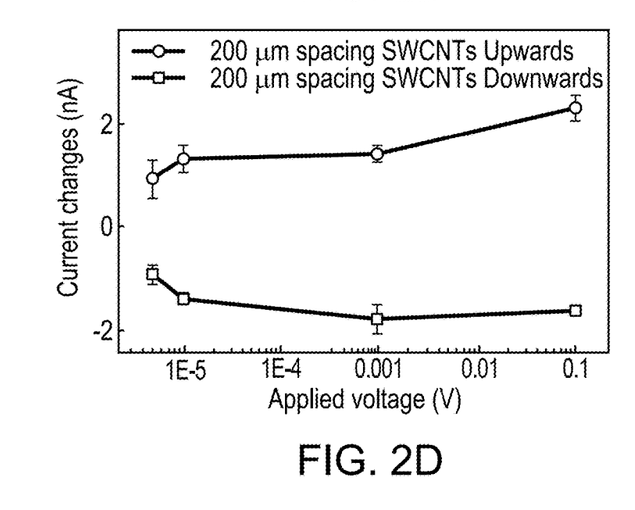

FIG. 2C shows the changes in electric current of an embodiment of the sensor having a 200 µm finger spacing at a bias of 10 µV. In contrast to the 50 µm spacing nanotube device shown in FIGS. 2A-B, the change in current under X-ray radiation is smaller (within 2 nA). Further, both positive current (upward) and negative current (downward) are detected in the 200 µm sensor, as shown in FIG. 2D. The cause for this different current change in the 200 µm spacing may be as follows. First, when the X-rays (50 kVp) ionize krypton gas, the generated electrons and positive ions are subjected to an electric field of 200 µm at 10 µV. However, due to the electrodes' greater separation (200 µm), the generated electric field and capability of charge carrier separation are weaker than those for the 50 µm spacing nanotube device. Therefore, the positive potential can be saturated with the electrons generated by X-rays. Simultaneously, this negative potential accumulated by saturated electrons attracts nearby positive ions, producing a reverse current (downward). As a result, the amount of current changes for upward and downward directions after exposure of the X-ray is almost the same and symmetric in FIG. 2C.

Figure 2E:
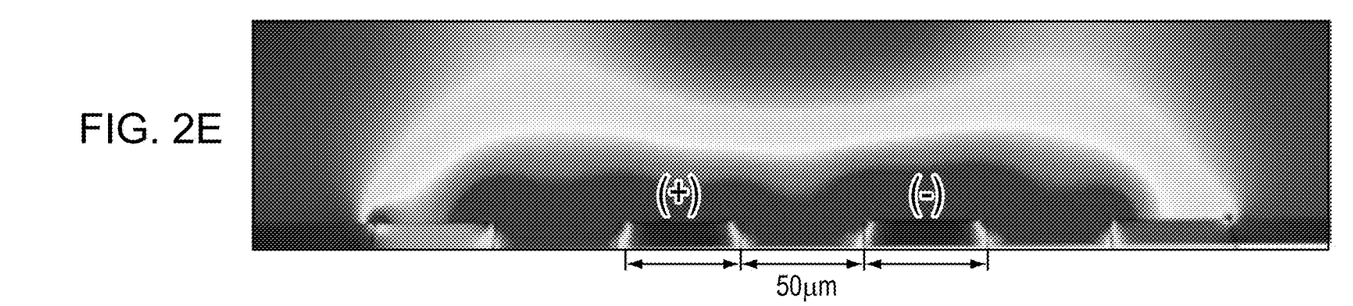
Figure 2F:
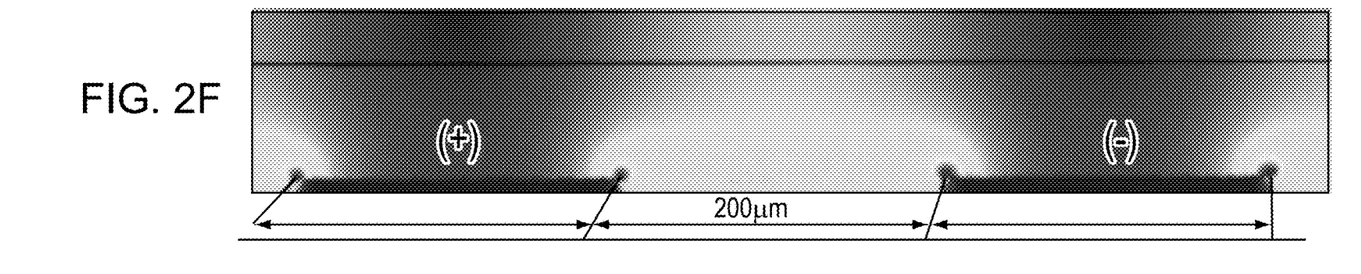

FIGS. 2E-F illustrate a simulated electrical field of the 50 µm spacing sensor (FIG. 2E) and a 200 µm spacing sensor (FIG. 2F) at 5 µV applied voltage (units are shown in V/s). The simulation may be conducted using a multiphysics simulation tool (e.g., COMSOL) to investigate the behavior of electric fields for different spacings. As shown, the electric field simulation between interdigitated electrodes of the 50 and 200 µm sensors at fixed 5 µV bias exhibited strong (50 µm) and weak (200 µm) electric fields between the interdigitated electrodes. The simulated results are consistent with the findings that a smaller separation (50 µm) provides a stronger electric field than that with a greater separation (200 µm).

Figure 3A:
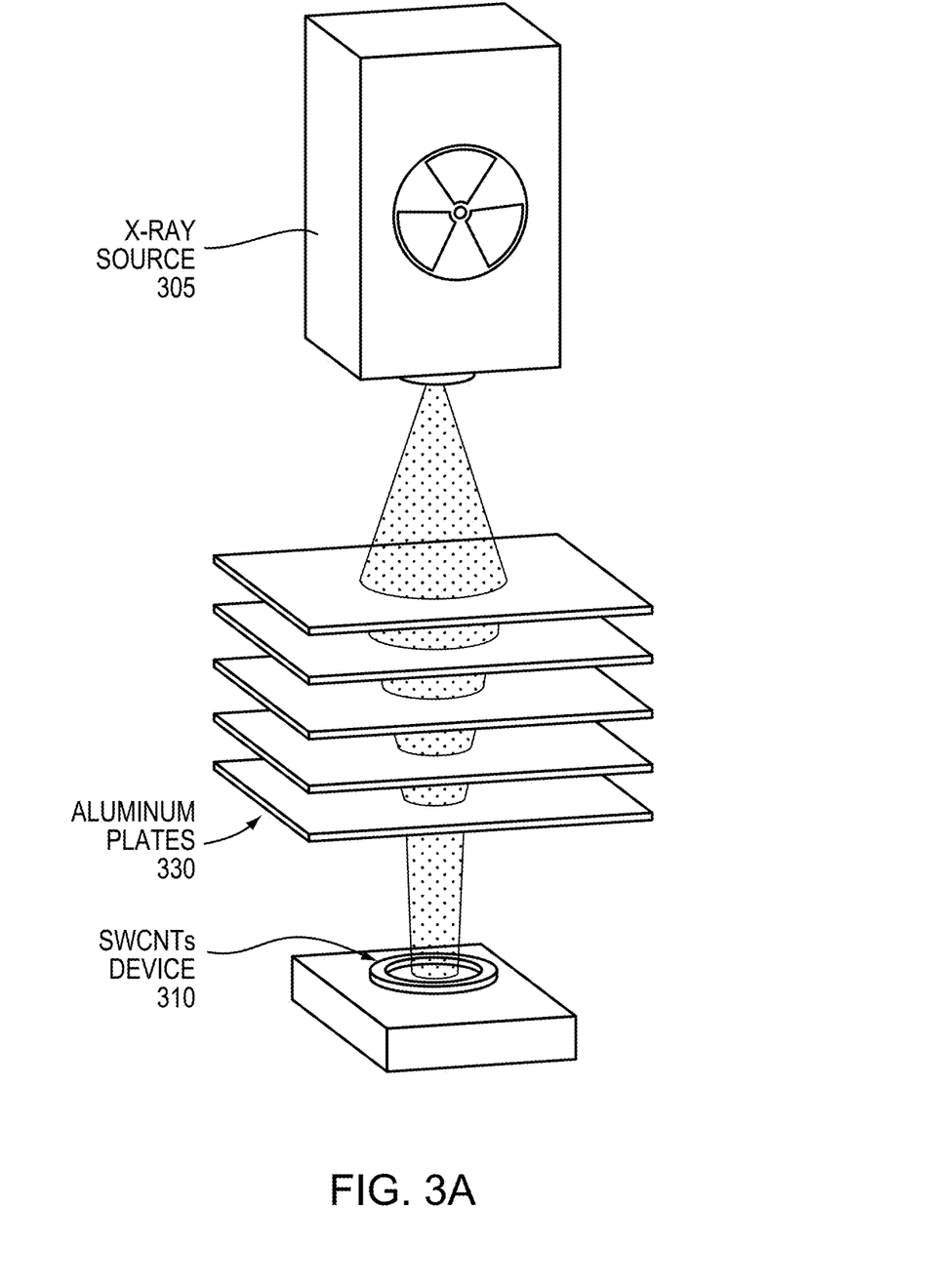
FIG. 3A is a diagram of a test configuration of a radiation detector in one embodiment.

FIG. 3A illustrates a test configuration for evaluating the performance of a radiation sensor in one embodiment. As shown, a sensor 310 may be mounted on a surface and oriented to receive X-ray radiation from an X-ray source 305. To evaluate the sensitivity of the nanotube sensor 310, the intensity of the X-ray radiation may be attenuated by placing one or more aluminum plates 330 within the path of the radiation.

Figure 3B:
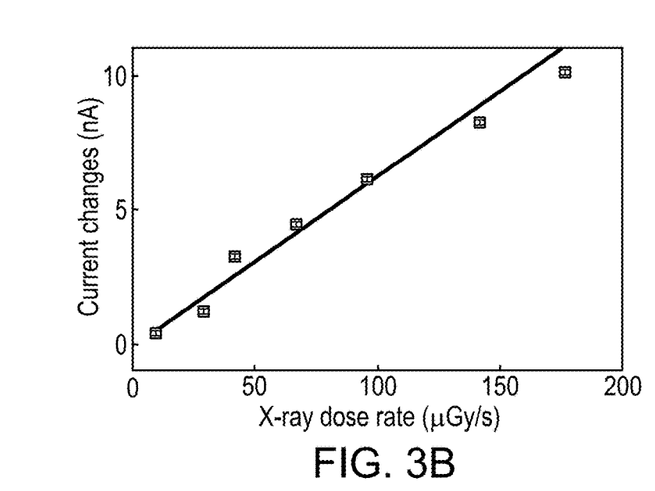
FIGS. 3B-E are plots illustrating electrical response of a radiation detector in the test configuration of FIG. 3.

FIGS. 3B-E are plots illustrating electrical response of a radiation detector in the test configuration of FIG. 3A. FIG. 3B shows the electric current changes in the 50 µm spacing nanotube interdigitated sensor 310 with controlled X-ray doses. In an example testing procedure, using a dosimeter, an X-ray dose rate of 176.7 µGy·s$^{-1}$ may be obtained without Al plates. Then, the attenuated X-ray doses with various thicknesses of Al plates may be calculated by a tungsten anode spectral model using an interpolating polynomials (TASMIP) algorithm and Monte Carlo N-Particle extended (MCNPX) simulation. The simulation may be based on the calculation of fluence corresponding to the thickness of the aluminum plates. The measured electric current change in the sensor tends to increase linearly when the X-ray dose rate increases, showing no distortion factor by changing the thickness of the aluminum plate. This feature enables our nanotube X-ray sensor to potentially be used for X-ray beam profiling or locating the X-ray source. Then, determined the device's sensitivity to the X-ray may be determined with the estimated dose rate and the change in current.

Figure 3C:
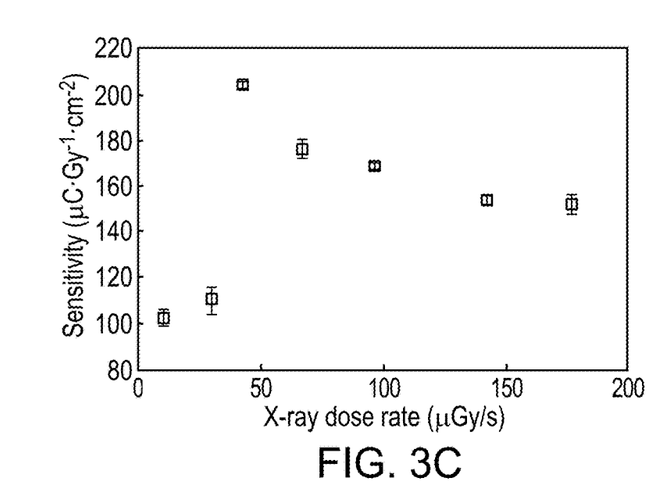

FIG. 3C shows the change in sensitivity of the sensor under the various X-ray dose rates. The sensor shows the sensitivity of 151.90 µC·Gy$^{-1}$·cm$^{-2}$ without any Al plate. The sensitivity of our device exponentially increases as the number of Al plates is added to reach a thickness of 7.5 mm, showing the highest sensitivity of 203.96 µC·Gy$^{-1}$·cm$^{-2}$ at the X-ray dose rate of 42.19 µGy·s$^{-1}$. However, when more Al plates are added, the sensitivity decreases to 102.88 µC·Gy$^{-1}$·cm$^{-2}$ due to the dramatically reduced photocurrent (0.39 nA, which is 88% less than a photocurrent at 7.5 mm Al thickness) under a lower dose rate. The measured photocurrents at the thicknesses of 7.5 and 17.5 mm are 3.27 and 0.39 nA, respectively, which is close to the resolution limit of the current measurement in our source meter. We also speculate that, with the higher incident energy of X-rays, the kinetic energy of a photoelectron may also be high enough to generate a secondary electron cascade from the krypton gases. Example embodiments, as tested, have obtained a sensitivity value of 203.96 µC·Gy$^{-1}$·cm$^{-2}$, which is higher than the areal sensitivity of other X-ray detectors employing ZnO42 or 4HCB45 as an active material. Further, the sensor can detect a low X-ray dose rate (9.97 µGy·s$^{-1}$) with a significantly high sensitivity of 102.88 µC·Gy$^{-1}$·cm$^{-2}$ and an extremely low applied voltage of 10 µV (power consumption of 80-90 fW). Although previous sensors report competitive sensitivities and a detectable dosage, their operating voltages typically range from 1 to 200 V, significantly greater than our low applied voltage of 5 and 10 µV.

Figure 3D:
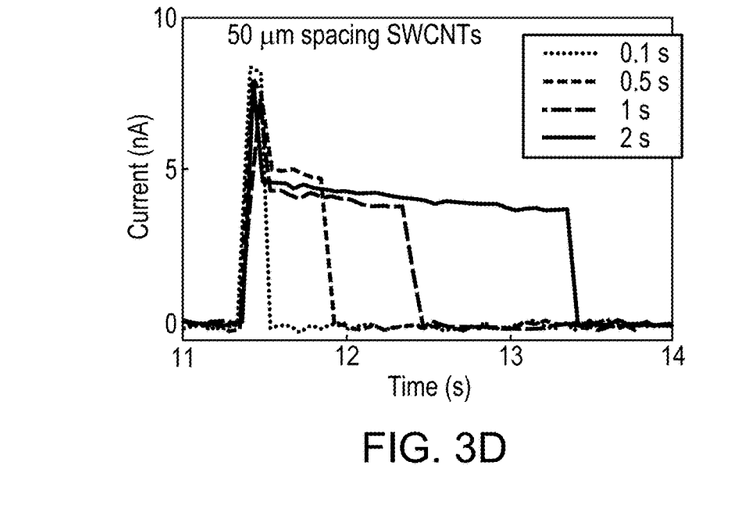
Figure 3E:
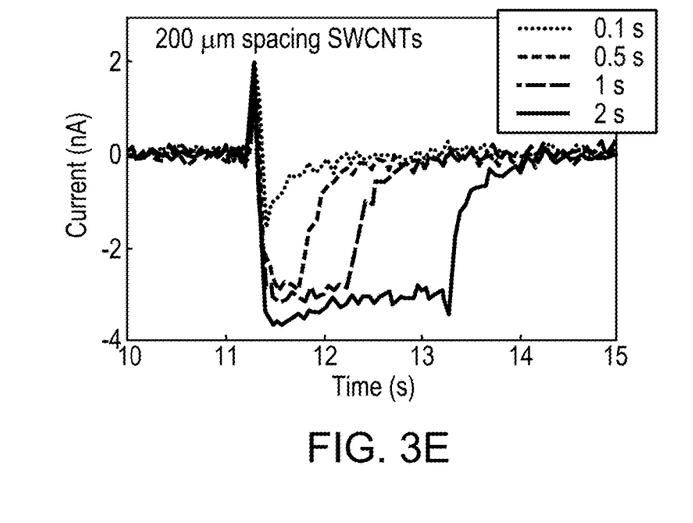

FIGS. 3D-E show the real-time X-ray detection behavior by profiling dose uptakes of the 50 and 200 µm spacing nanotube interdigitated devices, respectively. Both 50 and 200 µm spacing nanotube sensors demonstrate the dose and dose rate dependence with stabilized current detection when exposed to X-ray radiation from 0.1 to 2 s. In addition, sensors successfully show real-time Xray detection profiles, including initial higher X-ray intensity due to a high preheat value in the X-ray source, by changing their electric current level positively for the 50 µm sensor or negatively for the 200 µm sensor, depending on the detection mechanism described above with reference to FIGS. 2B and 2D.

Figure 4A:
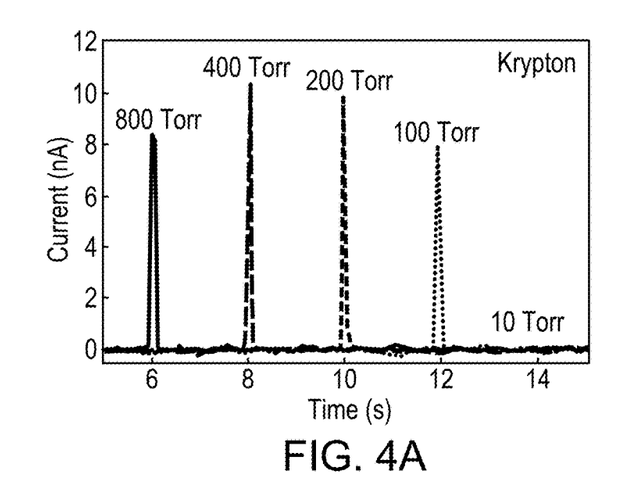
FIGS. 4A-D are plots illustrating operation of a radiation detector at a range of pressure conditions in one embodiment.
Figure 4B:
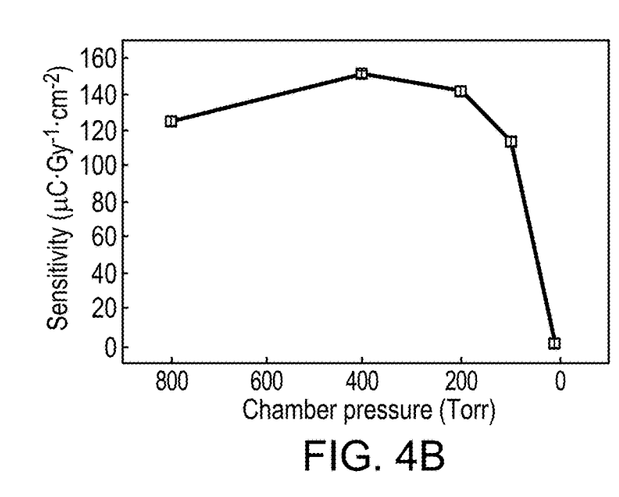

FIGS. 4A-D are plots illustrating operation of a radiation detector at a range of pressure conditions in one embodiment. To determine the effect of the ionized gas pressure inside the detector, the electrical responses of the nanotube sensor can be tested at various pressures with krypton (Kr) gas from 10 to 800 Torr (FIGS. 4A-B). The result shows the maximum current change and highest sensitivity at a pressure of 400 Torr. The electron-ion recombination process may be dominant at 800 Torr as a higher concentration of electron and ion pairs stimulates the recombination process due to intensive collisions inside the chamber. At 400 Torr of the chamber pressure, the nanotube sensor shows the most heightened sensitivity of 151.9 µC·Gy$^{-1}$·cm$^{-2}$ among the pressure-controlled test set with 20% enhanced current change compared to 800 Torr. This result may indicate that the density and movements of the positive ions and electrons under the applied electric field are mostly optimized. At 100-200 Torr pressures with Kr gas, relatively lower current peak intensities than at 400 Torr may be observed. Furthermore, the nanotube sensor could not detect the X-ray at 10 Torr, possibly due to insufficiently ionized particles and electrons at a low chamber pressure.

Figure 4C:
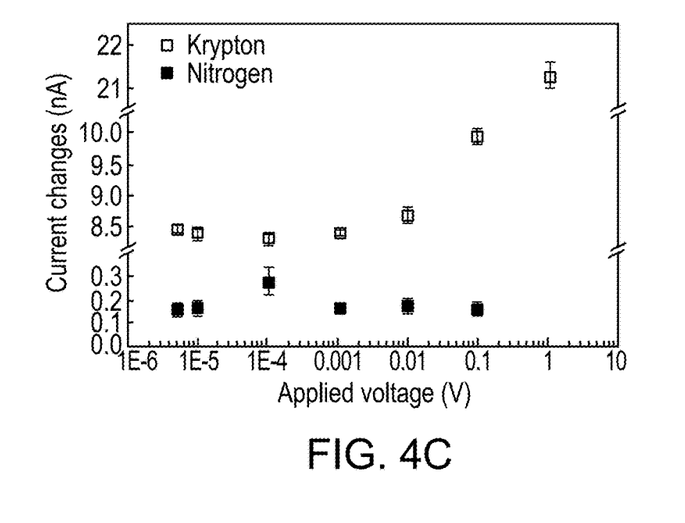
Figure 4D:
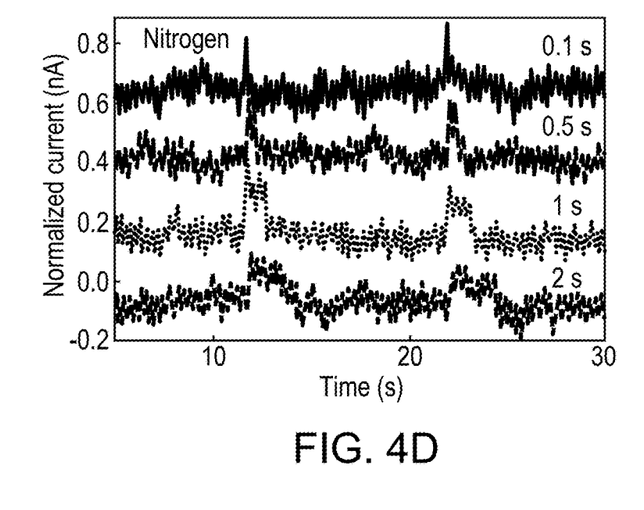

FIG. 4C shows current changes of the sensor when nitrogen (N2) gas and krypton (Kr) gas are used. The required mean energy of X-rays to produce an ion pair for krypton gas (24 eV), that is, the W value (W=E/n(E)), is smaller than that for N2 gas (34.8 eV), where E is the kinetic energy of charged particles and n(E) is the average number of ion pairs produced along the entire particle track. Therefore, Kr gases create more ionized particles and electrons, leading to more significant changes in electric current than nitrogen gas. FIG. 4D also shows the real-time detection of X-rays at different X-ray exposure times from 0.1 to 2 s in the nitrogen environment. Although the responses of X-ray detection in real-time is much lower than the response in krypton gas, changes in current profiling are still distinguishable at different X-ray exposure times in the nitrogen atmosphere. Due to the cost-benefit analysis and outstanding sensing performance in nitrogen gas, FIG. 4D demonstrates the potential use of N2 in example applications for low-cost SWAP X-ray sensor applications.

Figure 5:
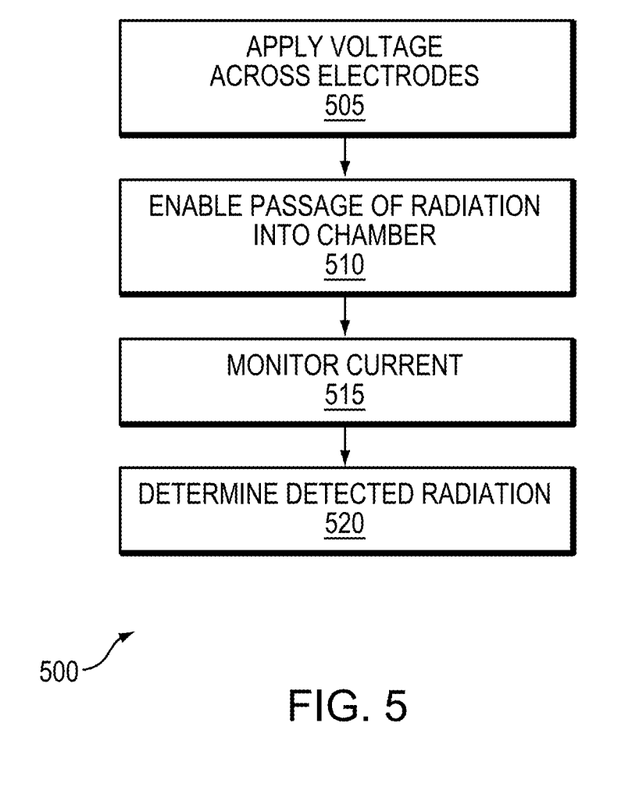
FIG. 5 is a flow diagram illustrating a method of radiation detection in one embodiment.

FIG. 5 illustrates a process 500 of radiation detection in one embodiment. With reference to FIGS. 1A-B, the voltage source and detection circuit 120 may apply a voltage across first and second electrodes 112, 114, thereby generating an electric field at the sensor 110 within the chamber 105 (505). At least one wall of the chamber 105 may enable the passage of radiation into the chamber 105 (510). The voltage source and detection circuit 120 may monitor the current across the first and second electrodes 112, 114, which may increase in response to the ionization of gas by radiation within the chamber as described above with reference to FIG. 2C (515). The voltage source and detection circuit 120 may then detecting the radiation within the chamber 105 based on a change in current across the first and second electrodes resulting from ionization of the gas by the radiation (520).

Example embodiments, described above, provide a low SWAP X-ray sensor with a micropatterned nanotube interdigitated network. The interdigitated nanotube electrode configuration enables a low noise level (in the picoampere range) in the nanotube devices, providing a high sensitivity of up to 203.96 $\mu C \cdot Gy^{-1} \cdot cm^{-2}$ and the capability of detecting X-rays of a very low dose rate (9.97 $\mu Gy \cdot s^{-1}$), and real-time signal detection during X-ray exposure. Furthermore, the nanostructured surface and electronic transport nature of assembled nanotubes provided a strong electric field formation between and within the nanotube microelectrodes. Therefore, example sensor devices can be operated with an extremely low voltage of 5 $\mu V$ and power consumption of 40-45 fW without lowering the superb X-ray sensing performance. These features of example sensors may allow X-ray detectors to be used for various applications, including self-powered X-ray detectors and dosimeters in medical, defense, and other daily life uses.

A sensor in example embodiments may be constructed as follows. A SWCNT solution may be used to form the first and second electrodes, and the SWCNTs may have a 1.2-1.7 nm diameter and a length range of 300 nm to 5 μm. To fabricate the SWCNT micropattern, photolithography may be used, followed by a dip coating with a 0.1 mg/mL concentration of the SWCNT solution at a speed of 0.1 cm/min. The thickness of the SWCNT can be controlled by varying the concentration of the SWCNTs and the dip coating speed. After the dip coating process, the undesired part of the photoresist can be removed by the lift-off process using acetone. Then, another photolithography process may be performed to pattern the metal electrodes. After patterning, the sensor was loaded into equipment for metal deposition. The metal device that does not require the deposition of SWCNTs can be loaded for metal deposition after patterning the finger part and electrode part simultaneously. After metal deposition, the unnecessary part may be removed using the lift-off process.

While example embodiments have been particularly shown and described, it will be understood by those skilled in the art that various changes in form and details may be made therein without departing from the scope of the embodiments encompassed by the appended claims.

What is claimed is:

1. A device for detecting radiation, comprising:
    a first electrode having a first plurality of fingers comprising a nanotube material;
    a second electrode having a second plurality of fingers comprising a nanotube material, the second plurality of fingers being interdigitated with the first plurality of fingers;
    a voltage source configured to apply a voltage across the first and second electrodes;
    a chamber containing the first and second electrodes and a gas, at least one wall of the chamber enabling passage of radiation external to the chamber; and
    a detection circuit configured to detect radiation within the chamber based on a change in current across the first and second electrodes resulting from ionization of the gas by the radiation.

2. The device of claim 1, wherein the nanotube material is at least one of a carbon nanotube material and a graphene material.

3. The device of claim 1, wherein the first plurality of fingers is separated from the second plurality of fingers by between 200 nanometers and 500 micrometers.

4. The device of claim 1, wherein the gas is an inert gas comprising at least one of krypton, nitrogen, argon, and xenon.

5. The device of claim 1, wherein the radiation is at least one of X-ray radiation and gamma radiation.

6. The device of claim 1, wherein the voltage across the first and second electrodes is less than 10 millivolts.

7. The device of claim 1, wherein the first plurality of fingers includes between 5 and 500,000 fingers.

8. The device of claim 1, wherein each of the first plurality of fingers extend in parallel to one another.

9. The device of claim 1, wherein each of the first plurality of fingers have a width of 1-500 micrometers.

10. The device of claim 1, wherein each of the first plurality of fingers have a length of 1-50 millimeters.

11. A method of detecting radiation, comprising:
    applying a voltage across first and second electrodes, the first electrode having a first plurality of fingers comprising a nanotube material, the second electrode having a second plurality of fingers comprising a nanotube material, the second plurality of fingers being interdigitated with the first plurality of fingers;
    enabling passage of radiation into a chamber containing the first and second electrodes and a gas; and
    detecting the radiation within the chamber based on a change in current across the first and second electrodes resulting from ionization of the gas by the radiation.

12. The method of claim 11, wherein the nanotube material is at least one of a carbon nanotube material and a graphene material.

13. The method of claim 11, wherein the first plurality of fingers is separated from the second plurality of fingers by between 200 nanometers and 500 micrometers.

14. The method of claim 11, wherein the gas is an inert gas comprising at least one of krypton, nitrogen, argon, and xenon.

15. The method of claim 11, wherein the radiation is at least one of X-ray radiation and gamma radiation.

16. The method of claim 11, wherein the voltage across the first and second electrodes is less than 10 millivolts.

17. The method of claim 11, wherein the first plurality of fingers includes between 10 and 10,000 fingers.

18. The method of claim 11, wherein each of the first plurality of fingers extend in parallel to one another.

19. The method of claim 11, wherein each of the first plurality of fingers have a width of 1-500 micrometers.

20. The method of claim 11, wherein each of the first plurality of fingers have a length of 1-50 millimeters.

* * * * *

UNITED STATES PATENT AND TRADEMARK OFFICE
CERTIFICATE OF CORRECTION

| | | |
|---|---|---|
| PATENT NO. | : 12,092,773 B2 | Page 1 of 1 |
| APPLICATION NO. | : 18/065344 | |
| DATED | : September 17, 2024 | |
| INVENTOR(S) | : Hyehee Kim et al. | |

It is certified that error appears in the above-identified patent and that said Letters Patent is hereby corrected as shown below:

On the Title Page

In Item (73) Assignees:
Please delete "Gangneung-Wongju National University" and insert --Gangneung-Wonju National University--.

Signed and Sealed this
Twenty-ninth Day of October, 2024

Katherine Kelly Vidal
*Director of the United States Patent and Trademark Office*